United States Patent
Clark et al.

(10) Patent No.: US 11,003,287 B2
(45) Date of Patent: May 11, 2021

(54) TOUCH SENSOR FOR DISPLAY WITH IMPROVED VIEWING ANGLE UNIFORMITY

(71) Applicant: Sharp Kabushiki Kaisha, Sakai (JP)

(72) Inventors: Nick Clark, Oxford (GB); Tim Michael Smeeton, Oxford (GB)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/942,064

(22) Filed: Mar. 30, 2018

(65) Prior Publication Data

US 2019/0302919 A1 Oct. 3, 2019

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS

| | | | |
|---|---|---|---|
| 8,664,646 B2* | 3/2014 | Kwack | H01L 51/5256 257/40 |
| 9,158,420 B2 | 10/2015 | Cok | |
| 9,262,001 B2* | 2/2016 | Lee | H01L 27/323 |
| 9,342,176 B2* | 5/2016 | Kim | G06F 3/0412 |
| 9,412,796 B2* | 8/2016 | Lee | G06F 3/0412 |
| 9,436,336 B2* | 9/2016 | Lee | G06F 3/0445 |
| 9,459,751 B2 | 10/2016 | Weaver et al. | |
| 9,471,167 B2 | 10/2016 | Lai et al. | |
| 9,696,835 B2 | 7/2017 | Her | |
| 2008/0304248 A1* | 12/2008 | Jin | H01L 27/3267 362/19 |
| 2010/0149116 A1* | 6/2010 | Yang | G06F 3/0416 345/173 |
| 2013/0037827 A1* | 2/2013 | Levermore | H01L 27/3202 257/88 |
| 2013/0051032 A1* | 2/2013 | Jones | B82Y 20/00 362/335 |
| 2013/0088681 A1* | 4/2013 | Hisada | G02F 1/134336 349/144 |
| 2013/0112542 A1* | 5/2013 | Wang | G06F 3/0412 200/600 |

(Continued)

OTHER PUBLICATIONS

Clark et al., "Touch Sensor Feedlines for Display", U.S. Appl. No. 15/942,036, filed Mar. 30, 2018.

(Continued)

*Primary Examiner* — William Lu
(74) *Attorney, Agent, or Firm* — Keating & Bennett, LLP

(57) ABSTRACT

A display device including a display panel including a plurality of sub-pixels; and an opaque material layer of a touch sensor that is located directly on the display panel and overlaps a portion of the display panel in between some of the plurality of sub-pixels; wherein the opaque material surrounds at least one of the some of the plurality of sub-pixels and includes at least five edges around the at least one of the some of the plurality of sub-pixels.

20 Claims, 9 Drawing Sheets

(56) References Cited

U.S. PATENT DOCUMENTS

| | | | | |
|---|---|---|---|---|
| 2014/0110681 A1* | 4/2014 | Hack | ................. | H01L 51/5203 |
| | | | | 257/40 |
| 2014/0168138 A1* | 6/2014 | Kuo | ................. | G06F 3/0443 |
| | | | | 345/174 |
| 2014/0231790 A1* | 8/2014 | Fujino | ................. | H01L 27/322 |
| | | | | 257/40 |
| 2014/0375911 A1* | 12/2014 | Lee | ................. | G06F 3/0412 |
| | | | | 349/12 |
| 2015/0060252 A1* | 3/2015 | Wang | ................. | H03K 17/9622 |
| | | | | 200/5 R |
| 2015/0287381 A1* | 10/2015 | Kim | ................. | G06F 3/0418 |
| | | | | 345/174 |
| 2016/0240593 A1* | 8/2016 | Gu | ................. | G09G 3/3225 |
| 2016/0300889 A1* | 10/2016 | Kim | ................. | H01L 51/5284 |
| 2016/0321982 A1* | 11/2016 | Lee | ................. | G09G 3/3607 |
| 2017/0005286 A1* | 1/2017 | Yun | ................. | H01L 51/5209 |
| 2017/0090634 A1* | 3/2017 | Yang | ................. | G06F 3/047 |
| 2017/0187004 A1* | 6/2017 | Giraldo | ................. | H01L 51/5253 |
| 2017/0294491 A1* | 10/2017 | Jo | ................. | G09G 3/2003 |
| 2017/0373277 A1* | 12/2017 | Noh | ................. | H01L 27/3244 |
| 2019/0035859 A1* | 1/2019 | Kang | ................. | H01L 27/323 |

OTHER PUBLICATIONS

Clark et al., "Touch Sensor for Display With Shield", U.S. Appl. No. 15/942,049, filed Mar. 30, 2018.

Clark et al., "Touch Sensor for Display", U.S. Appl. No. 15/942,060, filed Mar. 30, 2018.

\* cited by examiner

TOUCH SENSOR FOR DISPLAY WITH IMPROVED VIEWING ANGLE UNIFORMITY

BACKGROUND OF THE INVENTION

1. Field of the Invention

The present invention is directed to a touch sensor for an electronic display system. More specifically, the present invention relates to a self-capacitive touch sensor with improved viewing angle provided directly on an electronic display panel and a method of fabricating the same.

2. Description of the Related Art

An electronic display is a device, panel, or screen that visually presents images, text, or video that is transmitted electronically. Examples of electronic displays are used as components in televisions, computer monitors, digital signage, smart phones, and tablet computers. Display devices can either emit light, i.e., emissive type, or modulate light, i.e., non-emissive type.

An organic light emitting-diode (OLED) display device is an emissive type electronic display that includes an organic light emitting display panel and driver electronics to control the organic light emitting display panel. The organic light emitting display panel includes a matrix of sub-pixels with each sub-pixel including an organic light emitting-diode and a driving thin-film transistor (TFT). OLED displays are multi-color with a wide viewing angle, high contrast, and fast response speed.

An OLED display panel includes a pixel layer having colored sub-pixels, typically a combination of red, green, and blue (R, G, B). The pixel layer is typically constructed with two electrodes and an organic light-emitting layer between the two electrodes. The two electrodes include an anode electrode and a cathode electrode, which are applied with different voltages. The pixel layer is usually protected by an encapsulation or sealing layer that may include multiple thin layers or a sealing substrate.

A liquid crystal display (LCD) is a non-emission type display that includes a liquid crystal panel and driver electronics to control the liquid crystal panel. LCD panels include a series of cells that can each be driven independently to modulate input light. An active-matrix liquid-crystal display (AMLCD) includes a matrix of cells or sub-pixels with each sub-pixel including a switching TFT. The TFTs store the electrical state of each sub-pixel on the display while all the other sub-pixels are being updated. The sub-pixels typically include a corresponding red, green, or blue color filter driven in combination to form a color gamut.

A typical LCD includes an array substrate including the TFTs and connecting signal lines, an opposing substrate including the color filter, and a liquid crystal layer in between the two substrates. The driving electronics are used to create a voltage potential between a pixel electrode and a common electrode at each pixel to modulate adjacent liquid crystals in the liquid crystal layer.

The OLED display and LCD are increasingly popular, but other pixelated emissive and non-emissive type electronic display technologies are also well known.

Touch screens are widely used with electronic displays, especially for smart phones and mobile electronic devices. A touch screen is an input device that can be joined with an electronic display device to facilitate user interaction and control. Such devices typically include a touch sensor mounted on a surface of an electronic display that displays interactive information and control electronics to interpret a touch on the touch sensor.

Touch screen devices detect the location of an external touch or gesture of a finger, stylus, or similar object that occurs at or near the surface of the touch sensor. Such touch screens include a matrix of transparent conductive elements or electrodes that form a touch sensor that overlay the display device and separate control electronics to determine the location of the touch object near or in contact with the touch sensor. Touch sensors are typically transparent so the user can view displayed information on the display device through the touch-sensor. By physically touching, or nearly touching, the touch sensor in a location associated with displayed information, a user can select an operation associated with the displayed information. The touch sensor detects the touch and then electronically interacts with the control electronics, or controller, to determine and output the touch location. The output signal of the touch location is input to a processor that associates the touch location or gesture with the displayed information to execute a programmed task associated with the displayed information as a graphic user interface.

Touch screens can use a variety of technologies, including resistive, inductive, capacitive, acoustic, piezoelectric, and optical to locate a touch or gesture on a sensor.

Capacitive touch-screens are of at least two different types: self-capacitive and mutual-capacitive. Self-capacitive touch-screens use an array of transparent electrodes on the sensor in combination with the touching object to form a temporary capacitor, a capacitance of which is detected. Mutual-capacitive touch-screens use an array of transparent electrode pairs that form capacitors, a capacitance of which is affected by the touching object. In both types, each capacitor in the array is sensed to detect a touch, and the physical location of the touch-detecting electrode in the touch-screen corresponds to the location of the touch.

As mentioned, touch sensors are typically transparent or formed to be invisible to the user and minimize optical distractions and artifacts. While interacting with the display panel, the touch sensor should minimize ambient reflection, maximize display transmission, not degrade the image quality over a wide range of viewing angles, and not cause any Moiré patterns or other optical interference effects. Electrically, the touch sensor should be highly conductive and uniform to maximize sensitivity and minimize voltage potential gradients. Touch sensors are either transparent conductive materials or conductive elements that are spaced apart and are too small to be seen by the user.

A typical transparent touch sensor includes a patterned coating of a conventional transparent conducting material (TCM) such as a transparent conducting oxide (TCO) or indium tin oxide (ITO). Disadvantages of such designs include limited transparency and conductivity and increased sensitivity to mechanical or environmental stress. Thicker layers of conventional TCM increase conductivity and resistance to stress but reduce the transparency of the electrodes.

For increased conductivity and to overcome issues of touch sensors made from conventional TCM, touch sensors can be made from grid patterns of fine metal wires, meshes, or conductive traces. These micro-wires are opaque, but are meant to be fine enough and spaced apart so that they are normally not detectable by the user. Although more uniformly conductive than conventional TCM designs, patterns of micro-wire electrodes can visibly interact with pixels in a display and cause Moiré patterns and other optical interference artifacts.

In order to reduce the device thickness as much as possible, the touch sensor can be formed directly on the display, and the display and touch sensor can be manufactured in the same process. This can result in the reduction of production costs compared with production of the display and touch sensor as separate components and subsequently combining them together. However, because a manufacturing defect in the touch sensor results in the wasted production of the display, features that increase the manufacturing yield of the touch sensor are advantageous.

OLED display panels can exhibit a shift in color balance between an image viewed along a direction perpendicular to the surface of the display and an image viewed along other directions. This color shift can be caused by a change in the emission spectrum from sub-pixels of the display for different emission directions, and/or a change in the relative luminous intensity of emission from sub-pixels emitting different colors for different emission directions. Color shifts associated with changing viewing angles reduce the perceived quality of a display panel.

SUMMARY OF THE INVENTION

To overcome the problems described above, a preferred embodiment of the present invention provides a display device including a display panel including a plurality of sub-pixels; and an opaque material layer of a touch sensor that is located directly on the display panel and overlaps a portion of the display panel in between some of the plurality of sub-pixels; wherein the opaque material surrounds at least one of the some of the plurality of sub-pixels and includes at least five edges around the at least one of the some of the plurality of sub-pixels.

Another preferred embodiment of the present invention provides a display device including a display panel including a plurality of sub-pixels that emit different colors of light, and an opaque material layer of a touch sensor that is located directly on the display panel and overlaps a portion of the display panel in between some of the plurality of sub-pixels, wherein the opaque material surrounds the some of the plurality of sub-pixels and reduces light output of a first sub-pixel of the some of the plurality of sub-pixels more than a second sub-pixel of the some of the plurality of sub-pixels at a same output angle, and the first sub-pixel emits a different color of light than the second sub-pixel.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
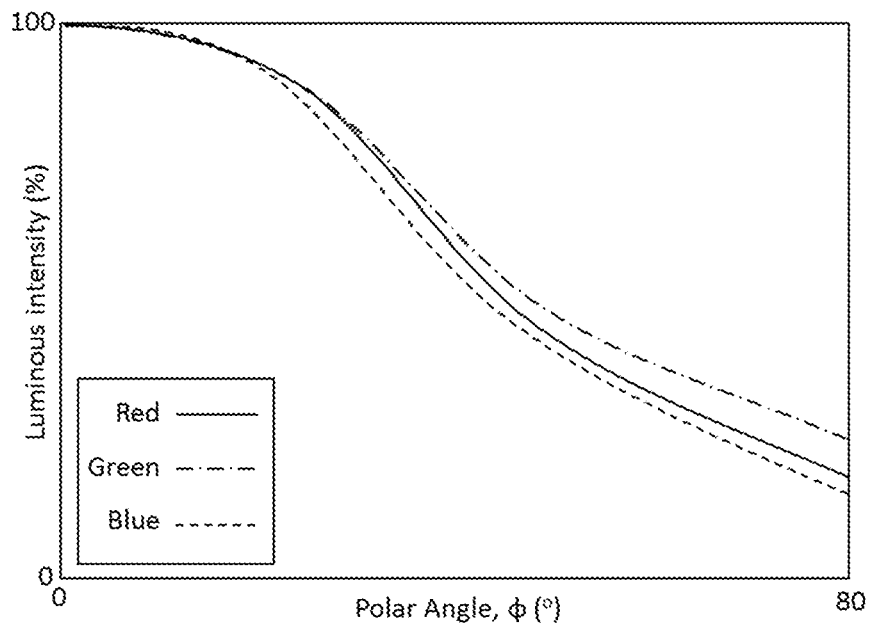
FIG. 1 is an example of relative luminous intensity over a range of polar angles for a display panel.

Preferred embodiments of the present invention provide self-capacitive touch sensors for use with electronic displays. In a preferred embodiment of the present invention, a touch sensor pattern layer can be formed directly on the encapsulation layer of an OLED pixel layer or substrate of an LCD closest to the sub-pixels and connected to a touch sensor controller to detect an external touch input. For convenience, the touch sensors of various preferred embodiments of the present invention will be described below with respect to an OLED display, but one of ordinary skill in the art will appreciate that the present touch sensors can be used with LCDs or any suitable electronic display technology.

A display panel includes a collection of sub-pixels on a TFT substrate and covered with a continuous transparent encapsulation material or substrate. The touch sensor includes a collection of touch electrodes and associated feedlines which connect the touch electrodes to a touch sensor controller. This creates a touch system that detects the position, in up to 3 dimensions, of a touch object relative to the display. The assembly of both the display panel and the touch sensor is referred to as the display device.

As noted above, self-capacitive operation means that the capacitance of an electrode is measured between the touch electrode and ground, a reference voltage of the touch sensor controller, or another portion of a display. In a mutual-capacitive operation, the capacitance is measured between different touch electrodes. Self-capacitive designs have the advantage of being more sensitive than mutual-capacitive designs.

Rather than combining two separate display panel and touch sensor components, the touch sensors of preferred embodiments of the present invention can be formed or disposed directly on the display panel to significantly reduce or minimize thickness.

A number of challenges and design requirements exist when developing a touch sensor for operation with an electronic display. The touch sensor wiring and an adjacent electrode of the display panel can create a parasitic capacitance.

It is advantageous to significantly reduce or minimize parasitic capacitance that is created between the touch sensor electrode and a closest electrode of the OLED sub-pixel. First, the touch electrode and the feedline that connects the touch electrode to the touch sensor controller form a series resistor-capacitor (RC) circuit where the voltage across the capacitor has an exponential response with a time-constant related to the RC. Therefore, reducing the parasitic capacitance reduces the charge time of the capacitor formed between the touch electrode and feedline and the OLED sub-pixel electrode to allow faster operation. Second, many available touch sensor controllers impose limits on the size of the parasitic capacitance and by reducing the absolute parasitic capacitance, the preferred embodiments of the present invention offer the widest compatibility with available touch sensor controllers.

To reduce the difference in capacitance values or dynamic range among the touch electrodes, maintain sensitivity across the touch sensor, and minimize the complexity and cost of the touch sensor controller, it is desirable that the capacitance, the RC constant, the size of touch electrodes, and the spacing between them be controlled and uniform across the touch sensor. Therefore, it is beneficial to increase the material conductivity to reduce the resistance of the feedlines and touch electrodes. In addition to making the design more tolerant to high capacitances, higher conductivity/lower resistance materials allow for longer feedlines, larger touch sensor designs, and reduced power consumption.

The color balance of OLED displays may not be constant for all viewing directions. This can be caused by the sub-pixels emitting different colors (e.g. red, green, blue) with each color exhibiting a different dependence of relative luminous intensity on viewing direction. The dependence of luminous intensity of a sub-pixel with viewing direction can be affected by optical interference within the sub-pixel, especially for sub-pixels that include an optical microcavity between reflective or partially reflective electrodes. Sub-pixels emitting different colors may have differently configured optical microcavities and, therefore, the dependence of luminous intensity on viewing angle may be different between them. Differences in variation in relative luminous intensity with viewing direction may also be caused by the shape of the sub-pixels. Thus, when an OLED display is viewed from different viewing directions—for example, viewed from a different polar angle $\phi$, where $\phi=0°$ normal to the front display surface—the luminous intensity of an individual sub-pixel (e.g., red, green, or blue) typically changes. The variation in luminous intensity with varying polar angle is not the same for the different colors of sub-pixels. Therefore, problematically, the ratio of the luminous intensity of each color relative to the others changes with changes in polar angle.

FIG. 1 shows an example of relative luminous intensity for polar angles $\phi$ up to 80° for each of emitted colors red, green, and blue as percent of the normalized luminous intensity for each color at $\phi=0°$. As shown in FIG. 1, there is little to no difference in the ratios of luminous intensity between each of the colors at low polar angles. However, at high polar angles the ratios of luminous intensity are different from those at 0°. This contributes to the displayed image exhibiting a color shift compared to the image viewed from a normal angle.

Figure 2:
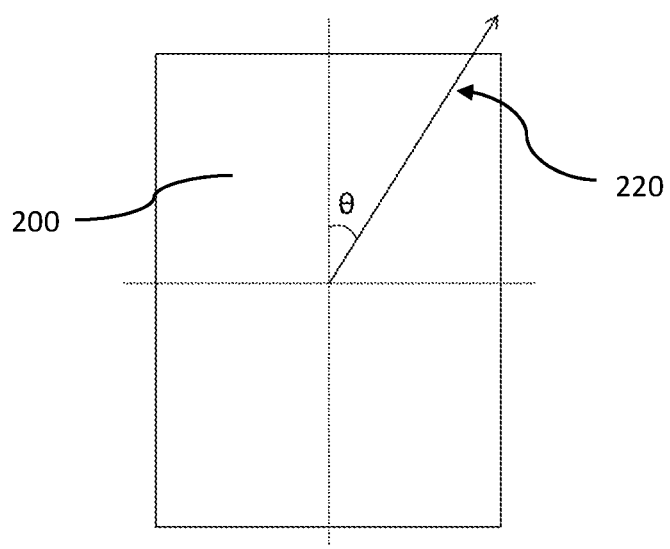
FIG. 2 shows azimuthal viewing angles with respect to a plan view of a front surface of a display panel.

In addition, the luminous intensity of sub-pixels and the ratio between the luminous intensities of the red, green, and blue sub-pixels may vary for different azimuthal viewing angles $\theta$, as defined in FIG. 2. FIG. 2 shows azimuthal viewing angles $\theta$ with respect to a plan view of a front surface of a display panel 200. Azimuthal viewing angles $\theta$ are measured clockwise from the 12:00 o'clock position ($\theta=0°$) to the direction in which the display panel is viewed 220.

Another cause of the change in color balance of OLED displays with viewing direction is a dependence on the spectrum of light emitted from at least one of the sub-pixel colors on viewing direction. This can also be caused by optical interference in a sub-pixel that includes an optical microcavity.

With respect to optical performance of the display panel combined with the touch sensor for a viewing direction with a polar viewing angle of $\phi=0°$, any light emitted by or through the display panel but blocked by the touch sensor will require more power to match the light output of a display panel without touch capability.

Preferred embodiments of the present invention solve the above described problems as described in detail below.

An emissive display such as an OLED display or Quantum Dot LED (QLED) display preferably includes a plurality of sub-pixel groups where each group emits light with a different color (e.g., red, green, and blue sub-pixel groups). A touch sensor includes touch electrodes and feedlines made of a conductive material (e.g., a metal) disposed directly on the display panel. Unless otherwise stated, all references to conductive herein refer to electrically conductive. The conductive material is opaque (i.e., blocks light) and does not overlap with the sub-pixels such that light exiting the display panel perpendicular to the display panel is not obscured by the conductive and opaque material.

A non-conductive and opaque material may also be disposed directly on the display panel. Patterns and distributions of the conductive and opaque material as described below should be understood to also apply equally to the non-conductive and opaque material, if present. A reference to "opaque material" or "opaque materials" could be electrically conductive material, non-electrically conductive material, or some combination thereof.

Figure 3A:
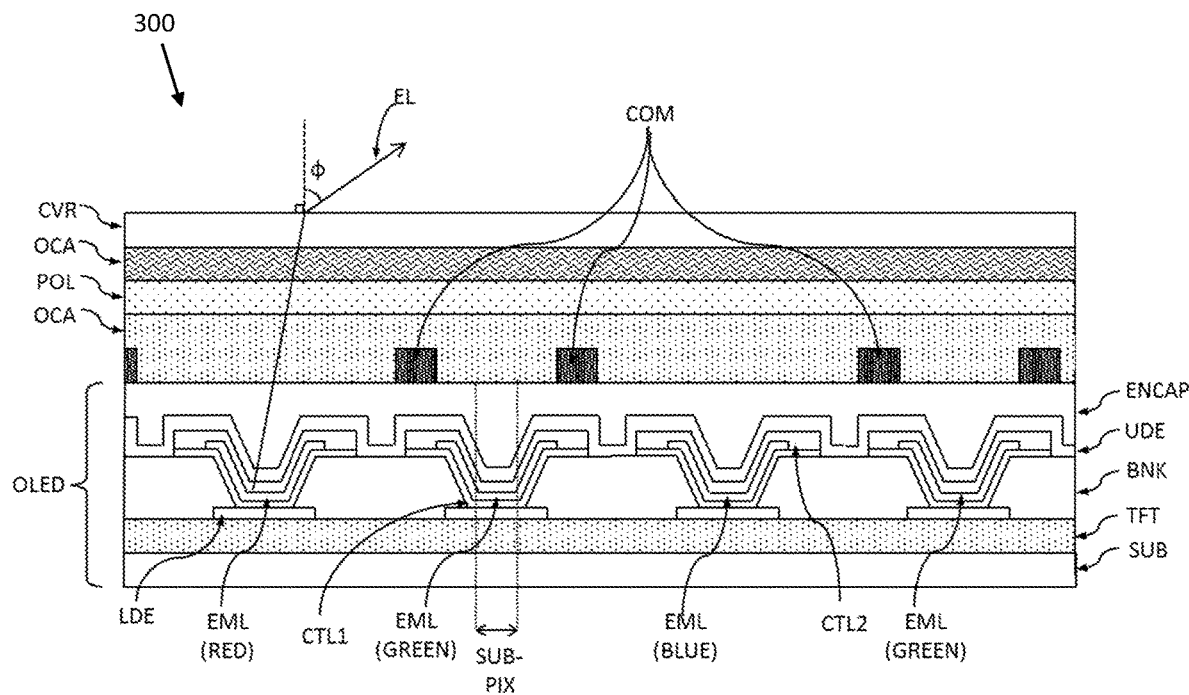
FIG. 3A is a side view of an OLED display panel and touch sensor according to a preferred embodiment of the present invention.
Figure 3B:
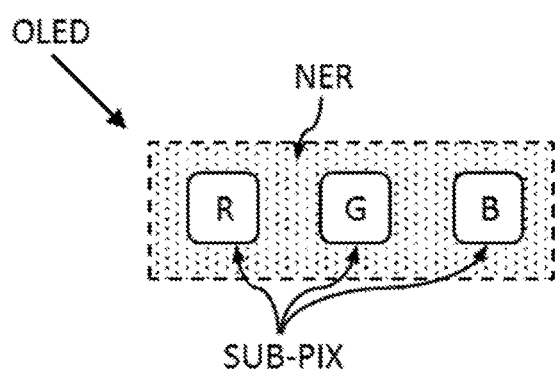
FIG. 3B is a plan view of a portion of an OLED display panel according to a preferred embodiment of the present invention.
Figure 3C:
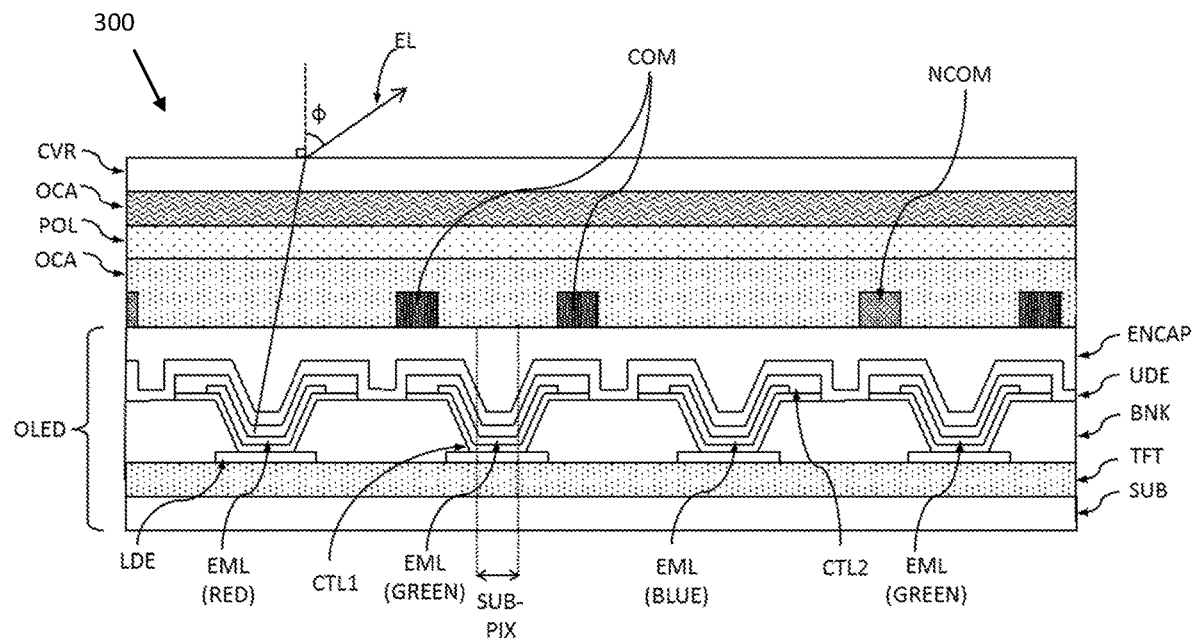
FIG. 3C is a side view of an OLED display panel and touch sensor according to a preferred embodiment of the present invention.

FIG. 3A is a side view of a display device 300 including an OLED display panel OLED and touch sensor of a preferred embodiment of the present invention. As shown in FIG. 3A, the display device 300 includes a substrate SUB, a TFT layer TFT on the substrate SUB, a lower display electrode LDE and a bank BNK on the TFT layer TFT, an OLED sub-pixel SUB-PIX on the lower display electrode LDE, an upper display electrode UDE on the OLED sub-pixel SUB-PIX, and an encapsulation layer ENCAP covering the OLED sub-pixel SUB-PIX to define the OLED display panel OLED. FIG. 3A shows one red, one blue and two green OLED sub-pixels SUB-PIX. FIG. 3B is a plan view of a portion of the OLED display panel OLED showing one red, one blue and one green OLED sub-pixel SUB-PIX. Light is emitted from the OLED sub-pixels SUB-PIX, and regions in between OLED sub-pixels SUB-PIX are non-emissive regions NER. In FIG. 3A, the lower and the upper display electrodes LDE, UDE can include a single cathode or anode electrode or a plurality of cathode or anode electrodes. As shown in FIG. 3A, the OLED sub-pixel SUB-PIX includes charge transport layers CTL1, CTL2 and a light emitting layer EML. A conductive and opaque material COM is provided on the encapsulation layer ENCAP and is patterned to define the touch electrodes and feedlines of the touch sensor in FIG. 3A. A patterned non-conductive and opaque material NCOM may also be included at the same level as the touch sensor, as shown in FIG. 3C. Optionally, a polarizer POL and/or cover material CVR can be laminated on the opaque material of the touch sensor with optically clear adhesive OCA.

As illustrated in FIG. 3A, the conductive and opaque material COM of the touch sensor is preferably patterned between the OLED sub-pixels SUB-PIX such that it does not overlap them. As illustrated in FIG. 3C, the non-conductive and opaque material NCOM is also preferably patterned between the OLED sub-pixels SUB-PIX such that it also does not overlap them.

Figure 4A:
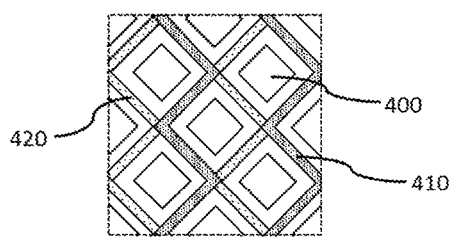
FIGS. 4A and 4B show representative portions of a plan view of a display device according to a preferred embodiment of the present invention.
Figure 4B:
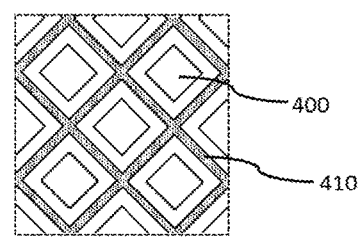

FIG. 4A and FIG. 4B show representative portions of a plan view of a display device according to a preferred embodiment of the present invention. As shown in FIG. 4A, the portions of the conductive and opaque material 410 of the touch sensor and the non-conductive and opaque material 420 are patterned between the sub-pixels 400. Preferably, the conductive and opaque material 410 of the touch sensor is patterned entirely around and preferably completely encircles and encloses a majority of the sub-pixels 400, as shown in FIG. 4B. However, preferably, not all of the sub-pixels 400 are entirely enclosed by the conductive and opaque material 410 as this provides electrical isolation between different touch sensor electrodes and feedlines defined by the conductive and opaque material 410. The non-conductive and opaque material 420 can also preferably be patterned in the spaces of the conductive and opaque material 410 in regions where the conductive and opaque material 410 does not fully surround a sub-pixel and do not overlap each other.

Figure 15:
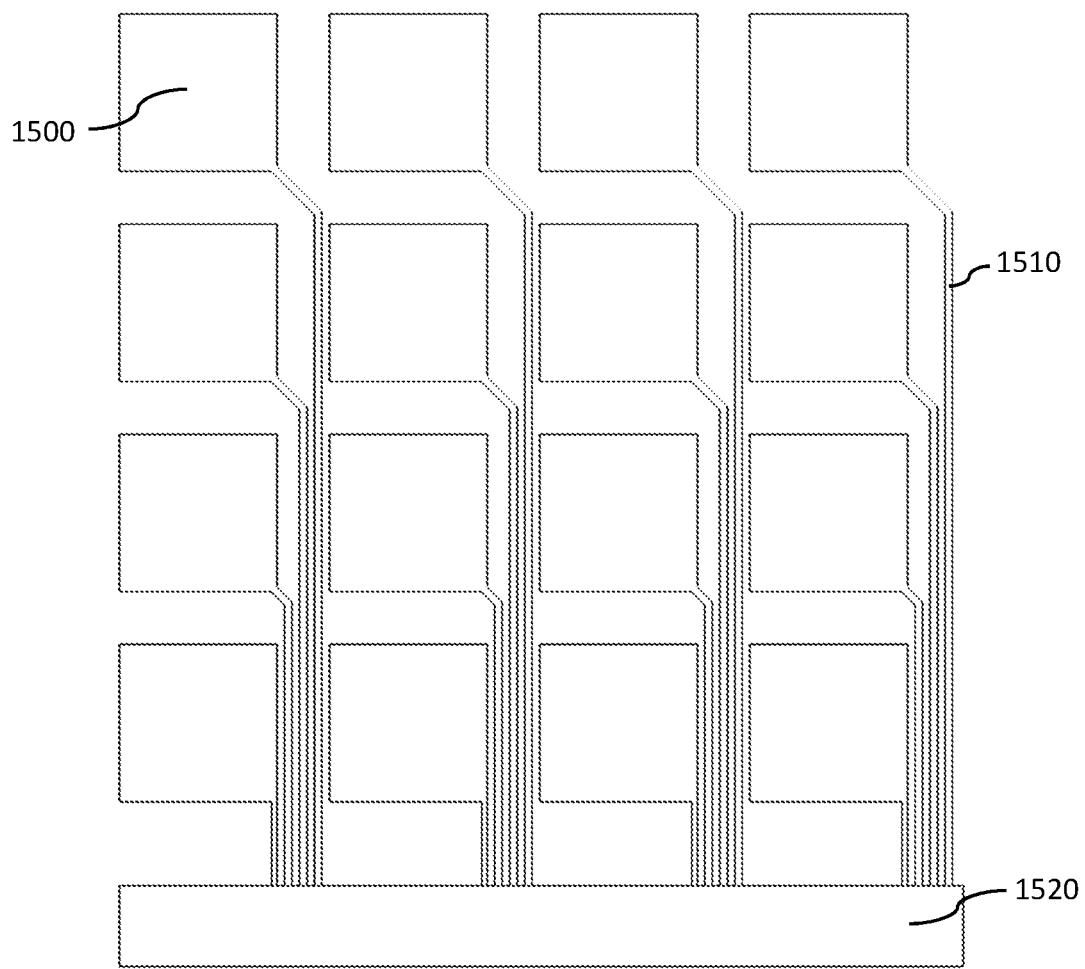
FIG. 15 is a representative distribution of touch electrodes and feedlines for a touch sensor according to a preferred embodiment of the present invention.

The configuration in FIG. 4A may be suitable for feedlines of the touch sensor, where FIG. 4A shows two feedlines of the conductive and opaque material 410 routed from top to bottom of the figure. The configuration in FIG. 4B may be suitable within touch electrodes of the touch sensor. A representative distribution of touch electrodes and feedlines for a touch sensor is shown in FIG. 15. The boundaries of the touch electrode 1500 and feedlines 1510 shown in FIG. 15 indicate the outer extent of the conductive and opaque material, and the distribution of the conductive and opaque material around the sub-pixels is not shown. Conductive and opaque material or non-conductive and opaque material may additionally be patterned between the sub-pixels of the display in regions of the display panel where there is neither a touch electrode nor a feedline. Preferably conductive and opaque material is used in these regions to ensure similar reflection of ambient light by the display device in the touch electrode regions. If conductive and opaque material is patterned in these regions of the display, it may be electrically floating or may be connected to a voltage source of the touch sensor controller 1520.

The conductive and opaque material and the non-conductive and opaque material may be formed in two steps. For example, the conductive and opaque material may be deposited as a layer, patterned using a photolithography process, and then etched to provide the required distribution. Next the non-conductive and opaque material may be deposited as a separate layer, patterned using a photolithography process and then etched to provide the required distribution. Preferably the conductive and opaque material and the non-conductive and opaque material would have the same or substantially the same thickness. Preferably the two materials will meet without a gap in between, but there may be small gaps (for example, less than 2 μm) between the two types of materials and still obtain the advantages of various preferred embodiments of the present invention. Preferably the two materials do not overlap one another as overlapping of the material increases the total thickness of opaque material and this may cause unwanted blocking of light emitted from at least one group of sub-pixels which would otherwise propagate in directions for high polar viewing angles.

The conductive and opaque material can be, for example, one of titanium, aluminum, copper, silver, gold, molybdenum, zinc, tungsten, nickel, tin, platinum, graphene, or any alloy thereof, but is not limited thereto. Optionally, the conductive and opaque material of the touch sensor can be a stack of multiple layers, for example, a sequence of Ti/Al/Ti layers or combination of the other materials mentioned, but is not limited thereto. The same conductive and opaque material(s) is preferably deposited and patterned to define all of the touch electrodes and feedlines in a shared process, but different materials, deposition process and patterning process may be used for the touch electrodes and feedlines. The conductive and opaque material may be deposited by evaporative coating in a vacuum and patterned using a standard photoresist and etch process, for example with a wet chemical etch or a reactive gas etch.

The non-conductive and opaque material can be, for example, one of a black resin, a black matrix resin, a polymer (e.g. polyimide, polystyrene, PTFE, or PET) or photoresist impregnated with a strong optical absorber such as carbon black, graphite, boron nitride, titanium black pigment, and boron nitride. The non-conductive and opaque material may be deposited by spin coating or an equivalent process and patterned by a photolithography and etch process.

Since the touch sensor and non-conductive and opaque materials are in between sub-pixels, they do not cause any reduction in the luminous intensity of light emitted perpendicular to the surface of the display ($\phi=0°$). This configuration is preferable to a configuration using conventional TCMs which overlap the sub-pixels because these materials are only partially transparent and thereby cause some absorption or reflection of light emitted from the OLED sub-pixels that propagates perpendicular to the surface of the display. Furthermore, because the touch sensor and non-conductive and opaque materials are preferably defined in a single layer, all of the opaque materials are located close to the plane of the light emission from the OLED. This makes it possible to reduce the extent of, or eliminate, blocking of light from the OLED sub-pixels that would otherwise propagate at a high polar viewing angle $\phi$ for at least one group of sub-pixels. An example of a direction of blocked light BL is shown in FIG. 5.

Preferably, the conductive and opaque material has a conductivity significantly higher than that provided by conventional TCMs. Therefore, the parasitic capacitance of the touch electrodes and feedlines is lowered without increasing resistance, and preferably with reduced resistance, compared with conventional continuous TCM layers. Thus, the conductive and opaque material of touch sensors of preferred embodiments of the present invention can be very thin and narrow with low resistance.

The opaque material is configured such that, when viewing of the display from a direction defined by a polar angle $\phi$, some of the light emitted from sub-pixels in a first sub-pixel group which would otherwise propagate towards the viewer along the polar angle $\phi$ is blocked (i.e., reflected, absorbed, or in some other way prevented from propagating towards the viewer) by the opaque material. Preferably, the opaque material is further configured such that the portion of light emitted from sub-pixels in a second sub-pixel group which is blocked by the opaque material is different from the portion of light from the sub-pixel in the first sub-pixel group which is blocked. Likewise, for a third sub-pixel group and so on. Preferably, no light is blocked from sub-pixels in at least one of the sub-pixel groups.

Figure 5:
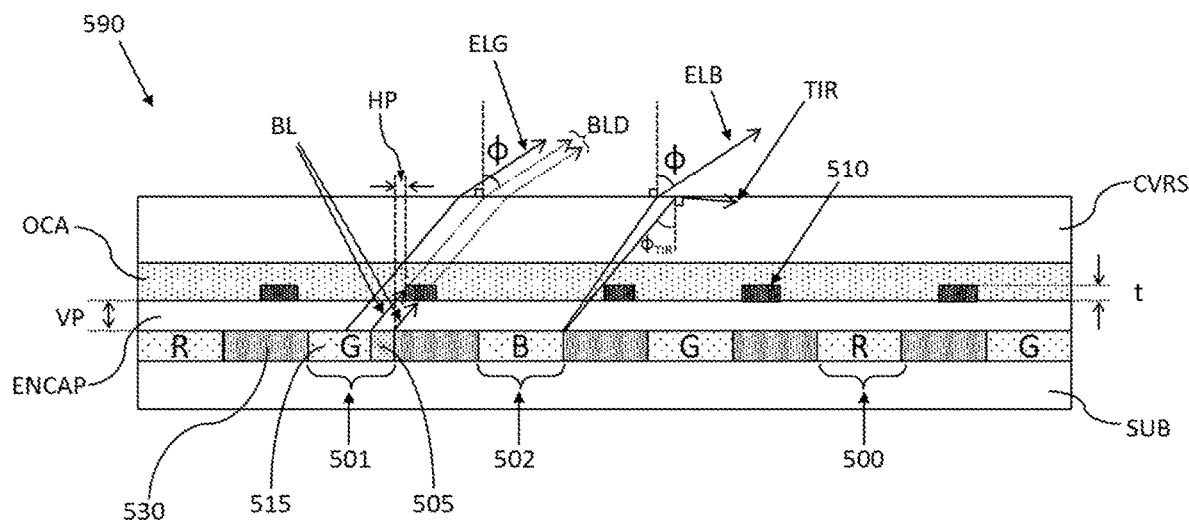
FIG. 5 illustrates a side view of a representative portion of an OLED panel according to a preferred embodiment of the present invention.

This is illustrated in FIG. 5, a side view of a representative portion of an OLED display device 590. FIG. 5 shows red, green, and blue OLED sub-pixels, respectively, 500, 501, 502 on a substrate SUB and an encapsulation layer ENCAP covering the sub-pixels 500-502 and the non-emissive regions 530 between the sub-pixels 500-502. In FIG. 5, the touch sensor layer (i.e. the opaque material 510) is on the encapsulation layer ENCAP, and optionally, an optically clear adhesive OCA and cover layers CRVS are shown on the touch sensor layer. FIG. 5 shows for a particular polar viewing angle $\phi$, a portion of the light (on the right hand side of the sub-pixel) from the green sub-pixel 501 that would otherwise propagate with the polar viewing angle $\phi$ is blocked by the opaque material 510. The blocked light is labelled BL and the direction that the light would propagate if it was not blocked is shown as dotted lines and labelled as the blocked light direction BLD. The sub-pixel 501 is an example of a sub-pixel in a sub-pixel group, a group of several sub-pixels surrounded by opaque material, and particularly it is an example of a sub-pixel in the first sub-pixel group where some of the light emitted from sub-pixels which would otherwise propagate towards the viewer along the polar angle $\phi$ is blocked by the opaque material. A sub-pixel group may be formed with sub-pixels of a different emission color.

In FIG. 5, none of the light from the blue sub-pixel 502 that propagates with the polar viewing angle $\phi$ is blocked by the opaque material 510 so light from the right hand portion of the sub-pixel is emitted light ELB. Furthermore, the opaque material 510 is configured so that none of the light emitted from the blue sub-pixel 501 in a direction which would be directly incident on the interface between the cover layers CVRS and air at all angles of incidence up to the critical angle ($\phi_{TIR}$) for transmission through the CVRS/air interface is blocked by the opaque material 510. Any light incident on the CVRS/air interface at an angle of incidence higher than the critical angle $\phi_{TIR}$ will undergo total internal reflection (TIR) and will not contribute to the emission from the display device. Therefore, if there is no blocking of light up to the critical angle $\phi_{TIR}$, then no light which would otherwise be directly emitted from the display device is blocked by the opaque material 510. The blue sub-pixel 502 shown here is an example of a sub-pixel in a sub-pixel group for which no light is blocked by the opaque material 510.

The opaque material 510 in FIG. 5 is patterned such that for some viewing directions (characterized by azimuthal viewing angle $\theta$ and polar angle $\phi$) blocked light BL from a first area of a sub-pixel 505, which would otherwise propagate in the viewing direction, is incident on and blocked by the opaque material 510. Light from the remaining second area of the sub-pixel 515 which ultimately propagates in the same viewing direction is not incident on the opaque material 510 and is emitted light ELG. Where light is referred to as ultimately propagating in a viewing direction, it should be understood that the light for this viewing direction will generally arise from light propagating in a different direction within the OLED, encapsulation, and other cover layers, because of the refraction of light at the interface with air when emitted light exits the cover layers CVRS. The light emitted from the sub-pixel 501 which ultimately propagates in the viewing direction is a fraction of the light which would propagate in this direction if the opaque material 510 were not present, which is referred to herein as the transmitted fraction. Preferably, the transmitted fraction is at or near 100% for viewing angles between 0° and a first viewing angle, and then this fraction decreases for viewing angles greater than the first viewing angle.

Figure 6:
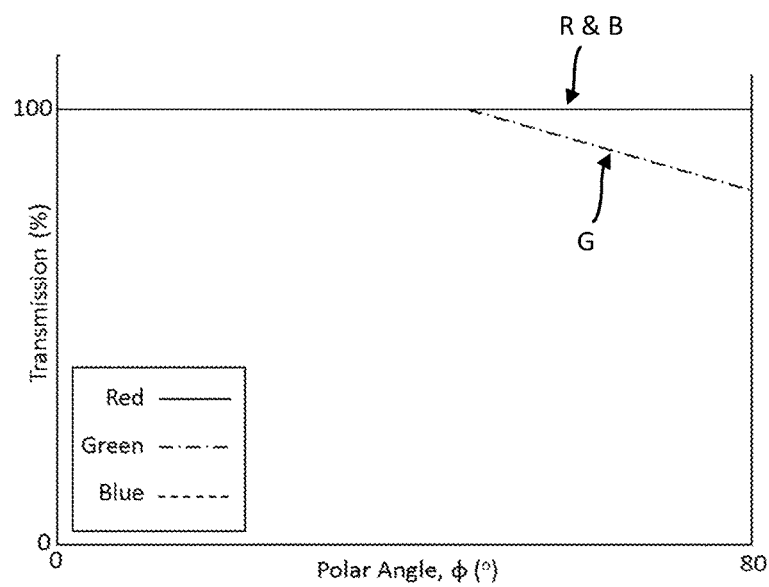
FIG. 6 shows an example of light output of red, green, and blue sub-pixels R, G, B in terms of percent transmission at different polar angles according to a preferred embodiment of the present invention.

When a display of a preferred embodiment of the present invention includes sub-pixels in different sub-pixel groups, the result may be a different light output profile for the sub-pixels in each sub-pixel group. FIG. 6 shows an example of light output profile of red, green, and blue sub-pixels R, G, B according to a preferred embodiment, where the light output profile is defined as the transmitted fraction (in %) at different polar angles $\phi$. As seen in FIG. 6, the transmitted fraction of a green sub-pixel G observed at high polar angle is lower than the transmitted fraction of red R and blue B sub-pixels which each have transmitted fractions at or near 100% for all polar angles in the range.

Referring to FIG. 5, a proportion of the area of the green sub-pixel 501, for example, from which light which would ultimately propagate in a particular viewing direction is blocked by the opaque material 510 is dependent on the horizontal proximity HP between the edge of the sub-pixel 501 and the opaque material 510, the vertical proximity VP between the emissive region of the sub-pixel 501 and the opaque material 510, the thickness 't' of the opaque material 510, the sub-pixel orientation, and the sub-pixel shape.

Figure 7:
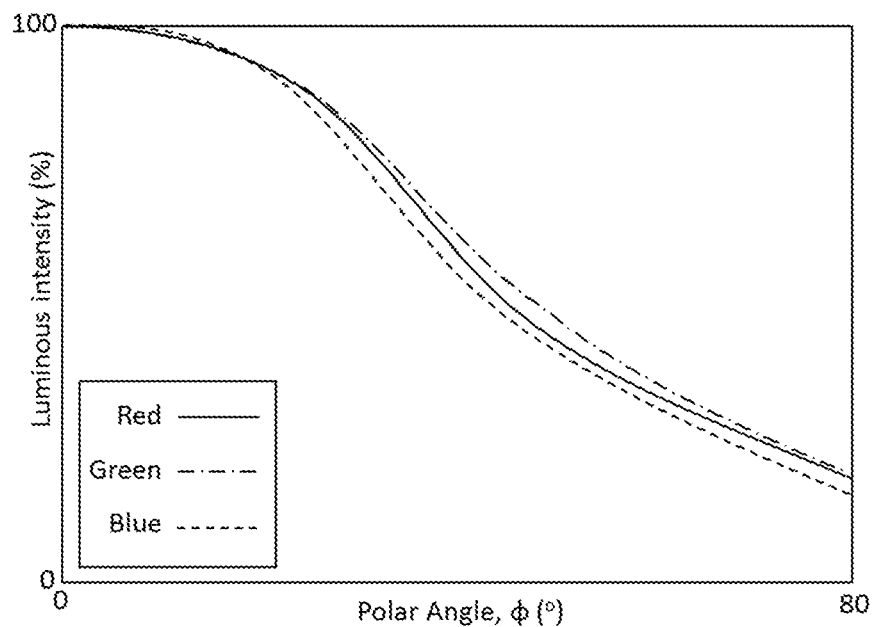
FIG. 7 shows an example of luminous intensity in percent at a polar angle for each of emitted colors red, green, and blue according to a preferred embodiment of the present invention.

In a preferred embodiment of the present invention, the light output profile for at least one sub-pixel group provides a display device with a smaller change in the ratio of luminous intensity between two different sub-pixel groups between high and low polar angles $\phi$, for a given azimuthal angle $\theta$, than without the opaque material. FIG. 7 shows an example of luminous intensity in percent for a range of polar angles ($\phi$) up to about 80° for each of emitted colors red, green, and blue according to a preferred embodiment of the present invention. As shown in FIG. 7, there is little to no difference in luminous intensity between each of the colors at low polar angles $\phi$. However, as the polar angle $\phi$ increases, the luminous intensity differences also increase, but less so than in that of the conventional art as shown in FIG. 1. Thus, preferred embodiments of the present invention contribute to less color shift as compared to a displayed image as viewed from higher polar angles $\phi$ using other technologies.

As shown in FIG. 6, preferably the light output profile has a transmitted fraction of 100% for all sub-pixel groups for polar angles between 0° and 50° and the transmitted fraction for at least one sub-pixel group reduces as the polar angles increases between 50° and 80° to a value of approximately 80% for a polar angle of 80°. The color of light can be defined in the 1976 CIE color space, as is known in the art, using a pair of coordinates (u', v'). The color shift, Δu'v', may then be quantified by $\sqrt{[(u'_{\phi=0°}-u'_{\phi=\alpha})^2+(v'_{\phi=0°}-v'_{\phi=\alpha})^2]}$, where α is an angle substantially away from 0°. The opaque material is configured so that the color shift Δu'v' for the display device for a viewing angle of at least one of polar angles ϕ=30°, ϕ=60°, and ϕ=80° is less than the value at the same polar angle without the opaque material. In an exemplary display device of a preferred embodiment of the present invention, the Δu'v' at ϕ=80° and all azimuthal angles is less than 0.08, and more preferably is less than 0.04.

In another preferred embodiment of the present invention, the light output profile for at least one sub-pixel group provides a display device with a smaller change in the ratio of luminous intensity between two different sub-pixel groups between different azimuthal angles θ, for a given polar angle ϕ, than without the opaque material.

Therefore, a common problem for OLED displays of color shifting along a range of viewing directions may be reduced by preferred embodiments of the present invention. The opaque material provides this optical correction while also providing a touch sensor electrode or feedline with a low RC constant and high optical uniformity (e.g. ambient reflectivity, display brightness) across the display panel.

Another characteristic of OLED displays is that there can be a change in color over viewing directions (in particular for different polar viewing angles) due to a change in the emission spectrum from individual sub-pixel groups at different viewing directions. This is particularly true when the OLED includes an optical microcavity, and an arrangement of layers with internal reflections that form a standing wave cavity resonator for light waves, within the OLED device. In a conventional display device, the microcavities of OLED sub-pixels are configured to provide a relatively low color shift (Δu'v') for the display for high polar angles both by having small change in emission spectrum for a given sub-pixel group, and by an approximately consistent ratio between the luminous intensity of the different sub-pixel groups. Meeting these requirements for relatively low color shift places constraints on the microcavity design which may compromise other properties of the OLED, as explained below.

An OLED may include a first electrode and a second electrode, an emissive layer between the first and second electrodes which emits light upon electron and hole recombination, one or more layers between the first electrode and the emissive layer, and one or more layers between the second electrode and the emissive layer. The one or more layers between the first electrode and the emissive layer may include injection and/or transport layers for a first charge type (e.g. electron) and blocking layers for a second charge type (e.g. hole). The one or more layers between the second electrode and the emissive layer may include injection and/or transport layers for the second charge type and blocking layers for the first charge type. Any layer between an electrode and the emissive layer may be referred to more generally as a charge transport layer. Thicknesses of the charge transport layers and the emissive layer, and the reflectivities of the two electrodes for the light emitted by the emissive layer affect the properties of a microcavity. Therefore, the thicknesses and reflectivities are chosen taking account of the requirements of the microcavity emission. This can result in non-ideal compromises in these thicknesses and reflectivities. For example, non-ideal thickness of one or more charge transport layers may reduce the internal quantum efficiency of the OLED, increase the bias required to deliver a particular current to the OLED, and/or reduce the extraction efficiency of the OLED. As a consequence, non-ideal thickness of one or more charge transport layers (i.e., thicknesses chosen to achieve a particular optical microcavity performance to minimize color shift, such as to minimize change in emission spectrum with respect to angle) may reduce the overall energy efficiency of the OLED. Advantageously, the distribution of the opaque material according to a preferred embodiment of the present invention provides an additional route to control the color shift with viewing direction of the display device. Therefore, there is more freedom to select optimum layer thickness and electrode reflectivities in the OLED, and adjust the color shift using the distribution of opaque material. The opaque materials may be distributed such that the blocking of light from at least one sub-pixel group reduces the change in perceived color between different viewing angles compared with a structure in which the opaque materials were absent. In this case, the opaque materials do not affect the change in emission spectrum of individual sub-pixel groups over viewing angle, but by adjusting the light output profile for different sub-pixel groups, the color shift over view angle is reduced.

Figure 8:
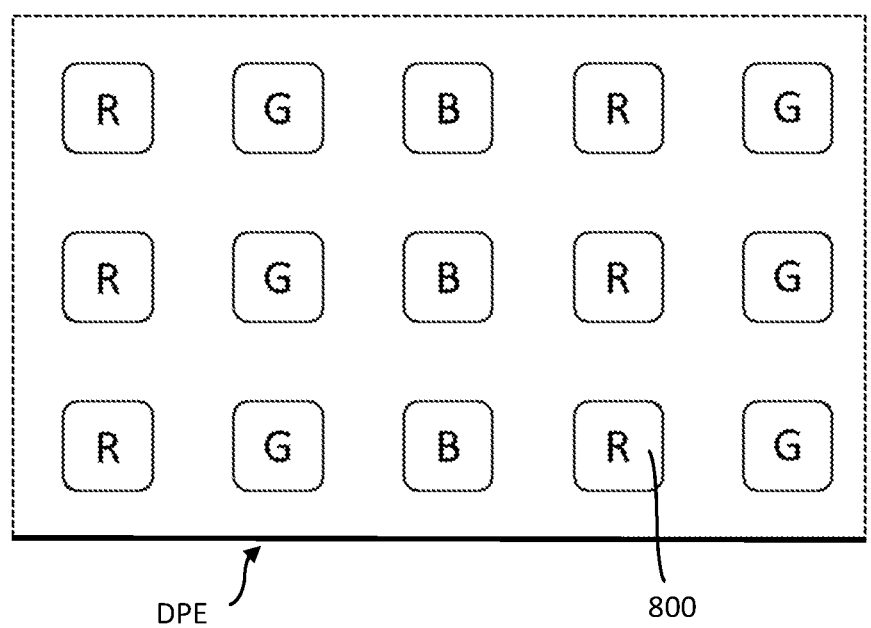
FIG. 8 shows a configuration of a first pixel distribution layout according to a preferred embodiment of the present invention.
Figure 9:
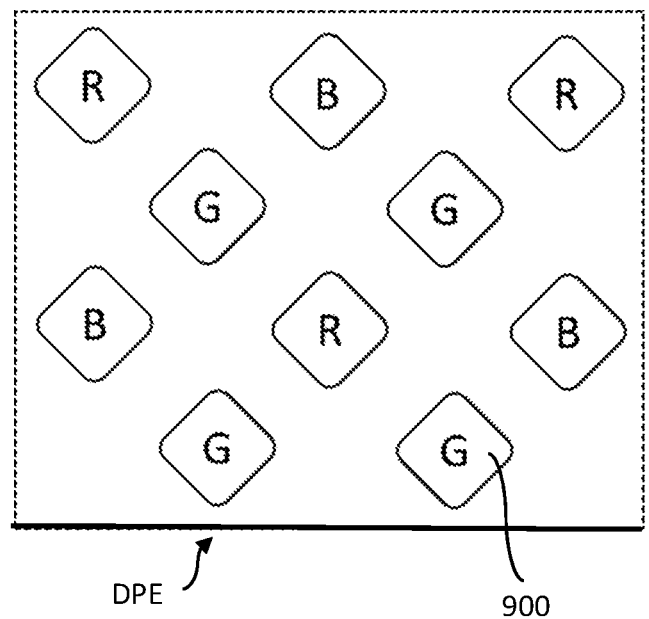
FIG. 9 shows a configuration of a second pixel distribution layout according to a preferred embodiment of the present invention.

The patterns of the opaque material of preferred embodiments of the present invention can be applied, but not limited to, different sub-pixel layouts and referred to as the first and the second sub-pixel distributions, as shown in FIGS. 8 and 9.

FIG. 8 shows a representative portion of the OLED display panel with the first sub-pixel distribution layout where edges of sub-pixels (R, G, B) 800 are aligned parallel or substantially parallel with a rectangular display panel edge DPE.

FIG. 9 shows a representative portion of the OLED display panel with the second sub-pixel distribution layout where edges of sub-pixels (R, G, B) 900 are aligned at 45° with the rectangular display panel edge DPE.

In all sub-pixel distributions, the sub-pixels can be of different sizes and shapes or of equal size (e.g., red sub-pixels may be different size and shape compared with green sub-pixels). The sub-pixels can be grouped into one or more groups of equal size and/or the same color. For example, the sub-pixel shape may be square, rectangular, rounded, have rounded corners, curved edges, or 5 or more straight edges. One sub-pixel may include more than one separate emissive region, each of which emits substantially the same color of light, for example.

Figure 10:
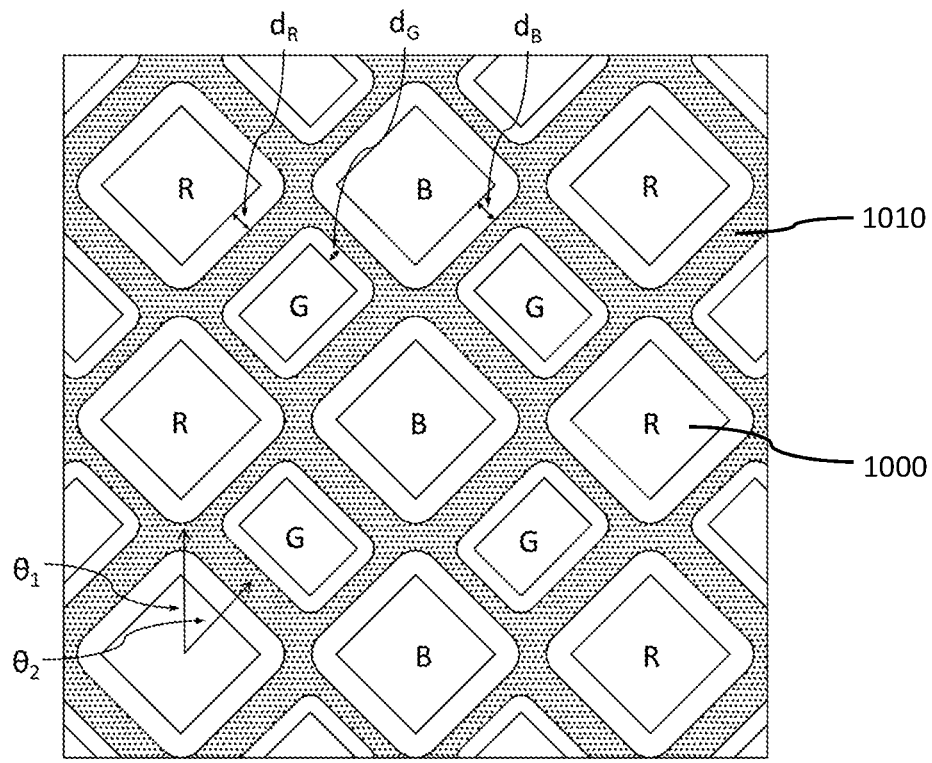
FIG. 10 shows a pattern of the opaque material of a preferred embodiment of the present invention in a representative portion of the OLED display panel with the second sub-pixel distribution layout.

FIG. 10 shows a pattern of the opaque material 1010 of a preferred embodiment of the present invention in a representative portion of the OLED display panel with the second sub-pixel distribution layout. As shown in FIG. 10, the opaque material 1010 surrounds a sub-pixel such that for sub-pixels of each sub-pixel group around a portion or all of the edge of the opaque material 1010, the smallest separation between the edge of the opaque material 1010 and the edge of the sub-pixel 1000 is constant or substantially constant (i.e., there is a uniform distance between the edge of the sub-pixel 1000 and the opaque material 1010). This arrangement may provide some blocking of light from a sub-pixel group for all azimuthal viewing angles θ and for polar viewing angles greater than a first polar viewing angle. The distance of the constant or substantially constant smallest separation may be varied between different sub-pixel groups to modify the light output profile for sub-pixel groups. This is represented in FIG. 10 where distances $d_R$, $d_G$, $d_B$ between the edges of respective red R, green G, and blue B sub-pixels and the opaque material 1010 are different between the respective sub-pixel groups. Preferably one of the sub-pixel groups has no light blocking, such that the overall luminous intensity of the display device for high polar viewing angle may be high.

This configuration is effective because the smallest separation between the edge of a sub-pixel 1000 and the opaque material 1010, measured along the azimuthal angle of the viewing direction, determines the smallest polar angle of viewing direction for which some light will be blocked.

One disadvantage of this preferred embodiment is that, for any non-circular geometry of sub-pixels, the rate at which the fraction of blocked light increases with increasing viewing polar angle will be different for different azimuthal viewing angles. This can be problematic because the color shift correction provided by the opaque material pattern may then only be satisfactory for a narrow range of azimuthal viewing angles. For example, the light output profile for two azimuthal viewing angles ($\theta_1$ and $\theta_2$), one parallel to and one at a 45° angle to the bottom edge of the display panel edge of FIG. 10 where the sub-pixels 1000 form rectangles at 45° with respect to the edge of the display panel and the perpendicular distance between an edge of a sub-pixel 1000 and the opaque material 1010 is constant or substantially constant around the entire sub-pixel, is shown in FIG. 11.

Figure 11:
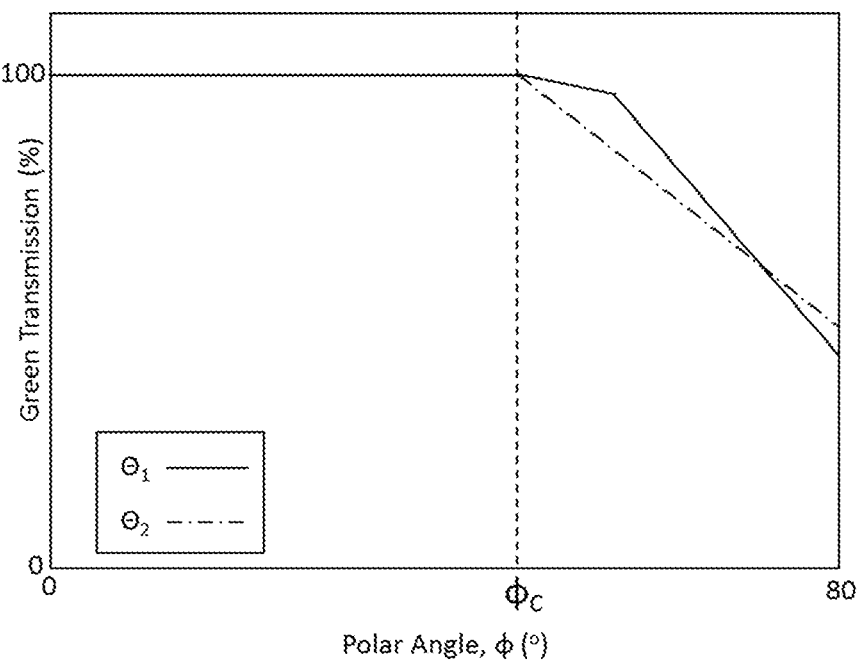
FIG. 11 is a plot of relative percent transmission for a green sub-pixel over a polar angle range for two azimuthal viewing angles shown in FIG. 10.

FIG. 11 is a plot of transmitted fraction for a green sub-pixel over a polar angle $\phi$ range for the two azimuthal viewing angles $\theta_1$, $\theta_2$ shown in FIG. 10. FIG. 11 shows that beyond the first polar viewing angle $\phi_C$, the transmitted fraction at both azimuthal viewing angles decreases. However, the rate of decreasing transmitted fraction is initially smaller for the parallel azimuthal angle $\theta_1$ because only the corner of the emissive region of the sub-pixel 1000 is affected whereas the light output along a complete edge of the emissive region of the sub-pixel 1000 is affected at the 45° azimuthal angle $\theta_2$. In order to affect sufficient blocking at the parallel azimuthal angle $\theta_1$, the reduction in transmitted fraction at the 45° azimuthal angle $\theta_2$ may become too severe. The configuration of the opaque material of FIG. 12 reduces or eliminates this problem.

Figure 12:
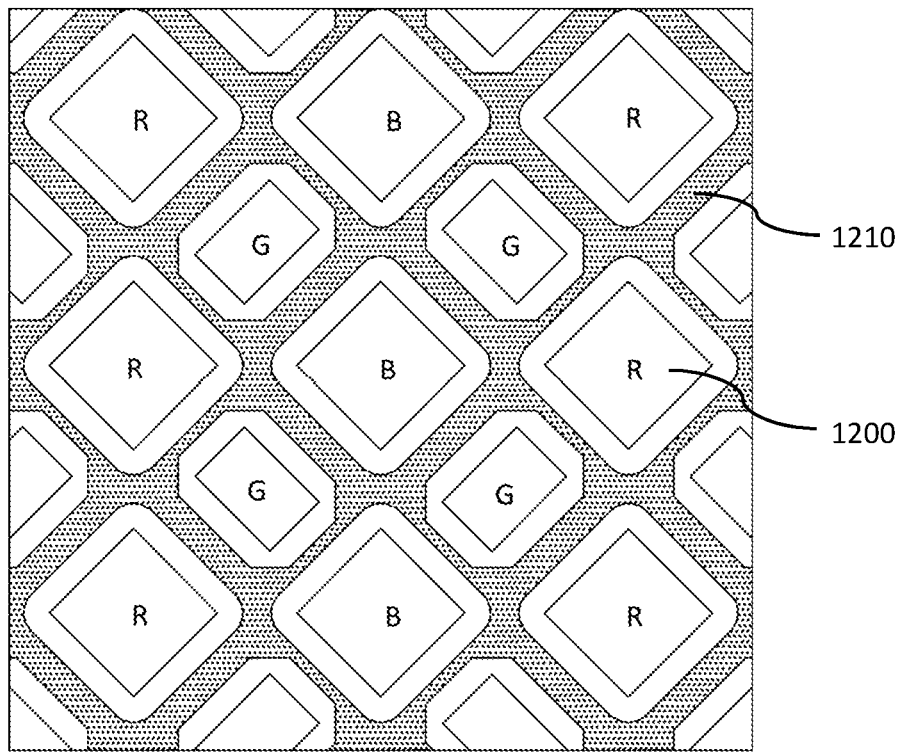
FIG. 12 shows a pattern of the opaque material of another preferred embodiment of the present invention in a representative portion of the OLED display panel with the second pixel distribution layout.

FIG. 12 shows a pattern of the opaque material 1210 of another preferred embodiment of the present invention in a representative portion of the OLED display panel with the second pixel distribution layout. As shown in FIG. 12, the opaque material 1210 is distributed around green sub-pixels G such that the opaque material 1210 has at least five edges, and preferably eight edges, for example. In particular, this arrangement is advantageous for sub-pixels 1200 which are square, substantially square, or rectangular (including squares and rectangles with cut-off or rounded corners). In these cases, preferably one or both of the following apply: (i) four of the edges of the opaque material are parallel or substantially parallel to the edges of the sub-pixel which is closest to them; (ii) the distance (measured along the direction perpendicular to the edge of the opaque material) between the opaque material and the edge of the corresponding sub-pixel is smaller close to the corners of the sub-pixel than at the center of the edges of the sub-pixel. Advantageously, this use of more than four edges for the opaque material provides blocking of light such that transmitted fraction for a particular polar angle does not vary significantly for different azimuthal angles. Furthermore, for OLED display panels with the second sub-pixel distribution layout, optical performance in azimuthal directions corresponding to the horizontal and vertical directions may be optimized, which may be a priority for the ways displays are commonly viewed.

Figure 13:
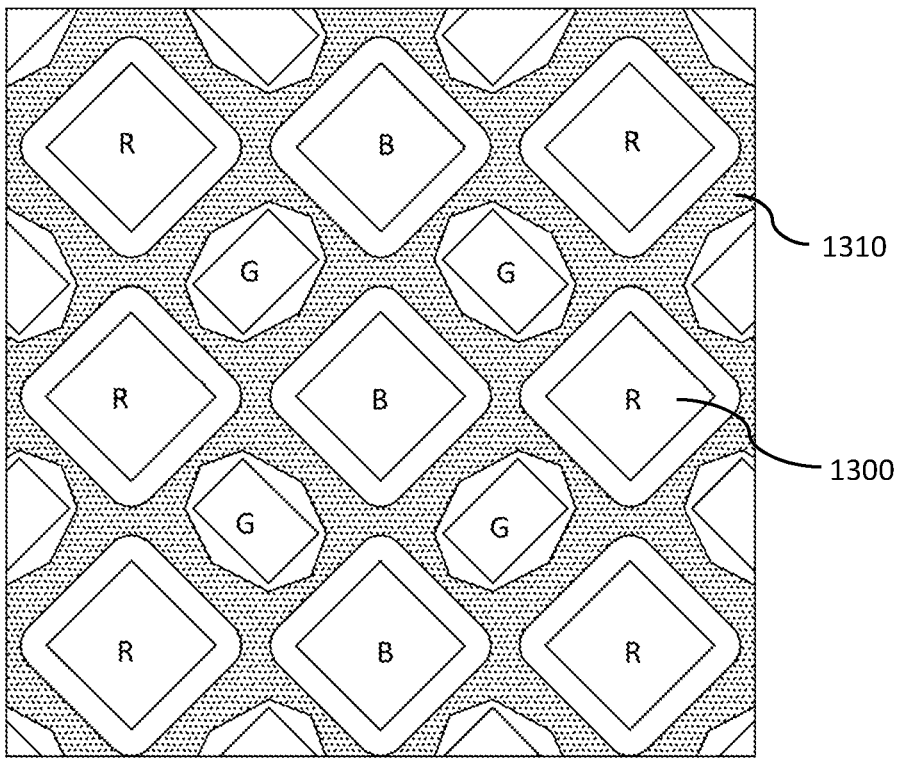
FIG. 13 shows a pattern of the opaque material of another preferred embodiment of the present invention in a representative portion of the OLED display panel with the second pixel distribution layout.

FIG. 13 shows a pattern of the opaque material 1310 of another preferred embodiment of the present invention in a representative portion of the OLED display panel with the second pixel distribution layout. As shown in FIG. 13, the opaque material 1310 is preferably patterned around green sub-pixels G such that the opaque material 1310 includes a feature of an angle or curve along the edges adjacent to the edges of the sub-pixel 1300. This arrangement is also advantageous for sub-pixels with emission regions 1300 which are substantially either square or rectangular (including squares and rectangles with cut-off or rounded corners) and can be used for any sub-pixels which are non-circular. Advantageously, this arrangement for the opaque material 1310 provides blocking of light such that transmitted fraction for a particular polar angle does not vary significantly for different azimuthal angles.

Figure 14:
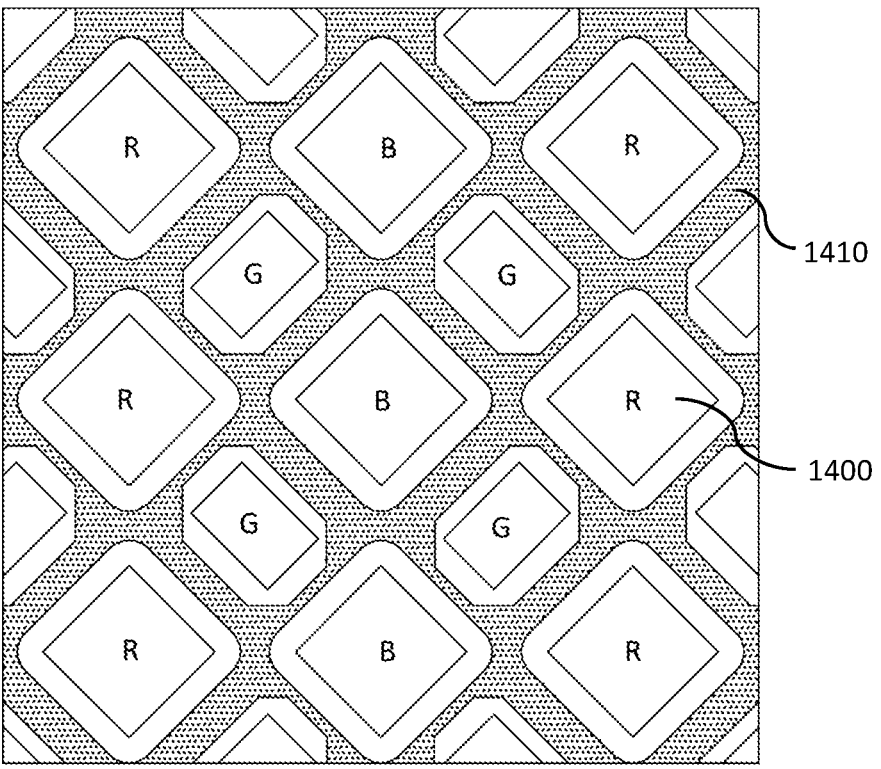
FIG. 14 shows a pattern of the opaque material of another preferred embodiment of the present invention in a representative portion of the OLED display panel with the second pixel distribution layout.

FIG. 14 shows a pattern of the opaque material 1410 of another preferred embodiment of the present invention in a representative portion of the OLED display panel with the second pixel distribution layout. As shown in FIG. 14, the opaque material 1410 is preferably patterned around green sub-pixels G such that the edges of opaque material 1410 are not symmetrical or regular. For example, FIG. 14 shows that one or more of the edges of the opaque material 1410 around the green sub-pixels G has a different length to define irregular patterns. Such a configuration can be used to customize the light output profile of the OLED display panel. For example, this configuration may provide customized color shift at high polar angle for different azimuthal viewing angles. Additionally, this configuration may be used to reduce the luminous intensity of up to all the sub-pixel groups for high polar viewing angles for one or more ranges of azimuthal viewing angles, thereby providing a privacy function for a display device such that the information displayed on the device cannot be seen clearly from some or all azimuthal directions for high polar viewing angles. In another example, this configuration may provide asymmetric viewing performance where optical characteristics are different along the azimuthal angles separated by 180° or by 90°.

In all of the configurations of FIGS. 12-14, the concept has been introduced based on the green sub-pixel group. Any of these concepts may be applied to any sub-pixel group.

It should be understood that the foregoing description is only illustrative of preferred embodiments of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A display device comprising:
 a display panel including a plurality of emissive sub-pixels covered by an encapsulation layer, each of the plurality of emissive sub-pixels including a light emitting region; and
 an opaque material layer defined by an electrode of a touch sensor that is located directly on the encapsulation layer of the display panel and overlaps a portion of the display panel in between some of the light emitting regions of the plurality of emissive sub-pixels; wherein
 the light emitting region of each of the plurality of emissive sub-pixels includes a material that emits light upon electron and hole recombination;
 a color of light emitted by electron and hole recombination of a first group of the plurality emissive sub-pixels is different from a color of light emitted by electron and hole recombination of a second group of the plurality emissive sub-pixels;

the opaque material includes a peripheral pattern surrounding at least one of the some of the light emitting regions of the plurality of emissive sub-pixels; and the peripheral pattern is different from a pattern of the at least one of the light emitting regions of the some of the plurality of emissive sub-pixels.

2. The display device of claim 1, wherein the peripheral pattern is an octagon.

3. The display device of claim 2, wherein the octagon includes parallel sides of equal length.

4. The display device of claim 1, wherein the opaque material is electrically conductive.

5. The display device of claim 1, wherein only a portion of the opaque material is electrically conductive and remaining portions of the opaque material are not electrically conductive.

6. The display device of claim 1, wherein
a number of edges of the peripheral pattern is more than a number of edges of the at least one of the some of the light emitting regions of the plurality of emissive sub-pixels.

7. The display device of claim 6, wherein
an edge of the peripheral pattern which faces to each of corners of the sub-pixel has a cut-off shape.

8. The display device of claim 6, wherein
a distance in a plan view of the display panel between a corner of the peripheral pattern facing to each of corners of the sub-pixel located closer than a distance in a plan view of the display panel between an edge of the peripheral pattern and an edge of the sub-pixel.

9. The display device of claim 1, wherein the encapsulation layer is located directly on the plurality of emissive sub-pixels.

10. A display device comprising:
a display panel including a plurality of emissive sub-pixels covered by an encapsulation layer, each of the plurality of emissive sub-pixels including a light emitting region; and
an opaque material defined by an electrode of a touch sensor that is located directly on the encapsulation layer of the display panel and overlaps a portion of the display panel in between some of the light emitting regions of the plurality of emissive sub-pixels; wherein
the light emitting region of each of the plurality of emissive sub-pixels includes a material that emits light upon electron and hole recombination;
a color of light emitted by electron and hole recombination of a first group of the plurality emissive sub-pixels is different from a color of light emitted by electron and hole recombination of a second group of the plurality emissive sub-pixels;
the opaque material includes a first peripheral pattern surrounding a first light emitting region of the some of the light emitting regions of the plurality of emissive sub-pixels, and a second peripheral pattern surrounding a second light emitting region of the some of the light emitting regions of the plurality of emissive sub-pixels;

the first peripheral pattern is different from a pattern of the first light emitting region;

the opaque material reduces light output of the first light emitting region more than the second light emitting region at a same output angle; and the first light emitting region emits a different color of light than the second light emitting region.

11. The display device according to claim 10, wherein a maximum distance measured in a plan view of the display panel between an edge of the first light emitting region and the opaque material is shorter than a maximum distance measured in a plan view of the display panel between an edge of the second light emitting region and the opaque material.

12. The display device according to claim 10, wherein an average distance measured in a plan view of the display panel between an edge of the first light emitting region and the opaque material is shorter than an average distance measured in a plan view of the display panel between an edge of the second light emitting region and the opaque material.

13. The display device according to claim 10, wherein
a distance measured in a plan view of the display panel between an emissive region of the first light emitting region and the opaque layer varies around the first light emitting region; and
the first peripheral pattern is different from the second peripheral pattern.

14. The display device according to claim 10, wherein the first peripheral pattern or the second peripheral pattern is an octagon.

15. The display device according to claim 14, wherein the octagon includes parallel sides of equal length.

16. The display device according to claim 10, wherein the display panel is an emissive display panel.

17. The display device according to claim 10, wherein the opaque material is electrically conductive.

18. The display device according to claim 10, wherein only a portion of the opaque material is electrically conductive and remaining portions of the opaque material are not electrically conductive.

19. The display device according to claim 10, wherein
a number of edges of the first peripheral pattern is more than a number of edges of the first light emitting region, and
a number of edges of the second peripheral pattern is equal to a number of edges of the second light emitting region.

20. The display device according to claim 19, wherein
an edge of the first peripheral pattern which faces to each of corners of the first light emitting region has a cut-off shape, and
a corner of the second peripheral pattern which faces to each of corners of the second light emitting region is a rounded corner.

* * * * *